United States Patent [19]

Wipasuramonton

[11] Patent Number: 5,116,080
[45] Date of Patent: May 26, 1992

[54] AIR BAG INFLATOR AND METHOD OF MAKING THE SAME

[75] Inventor: Pongdet Wipasuramonton, Rochester, Mich.

[73] Assignee: TRW Vehicle Safety Systems Inc., Lyndhurst, Ohio

[21] Appl. No.: 577,785

[22] Filed: Sep. 5, 1990

[51] Int. Cl.⁵ .............................................. B60R 21/28
[52] U.S. Cl. .................................... 280/741; 280/736
[58] Field of Search ............... 280/741, 742, 736, 737, 280/740, 728, 729, 743

[56] References Cited

U.S. PATENT DOCUMENTS

| | | | |
|---|---|---|---|
| 2,995,088 | 8/1961 | Splund | 102/202 |
| 3,267,672 | 8/1966 | Craig et al. | 102/531 X |
| 3,692,495 | 9/1972 | Schneiter et al. | 422/166 |
| 3,715,131 | 2/1973 | Hurley et al. | 280/736 |
| 3,951,428 | 4/1976 | Sugiura et al. | 280/737 |
| 3,972,545 | 8/1976 | Kirchoff et al. | 280/735 |
| 4,005,876 | 2/1977 | Jorgensen et al. | 280/741 |
| 4,153,273 | 5/1979 | Risko | 280/740 |
| 4,200,615 | 4/1980 | Hamilton et al. | 280/740 X |
| 4,244,758 | 1/1981 | Garner et al. | 149/35 X |
| 4,380,346 | 4/1983 | Davis et al. | 280/736 |
| 4,414,902 | 11/1983 | Strasser et al. | 280/741 X |
| 4,698,107 | 10/1987 | Goetz et al. | 280/741 X |
| 4,817,828 | 4/1989 | Goetz | 280/736 X |
| 4,878,690 | 11/1989 | Cunningham | 280/741 |
| 4,890,860 | 1/1990 | Schneiter | 280/741 |
| 4,938,501 | 7/1990 | Wipasuramonton | 280/743 |

*Primary Examiner*—Charles A. Marmor
*Assistant Examiner*—Kevin Hurley
*Attorney, Agent, or Firm*—Calfee, Halter & Griswold

[57] ABSTRACT

An air bag inflator structure comprises a container with gas dispensing nozzles, a lining disposed inside the container adjacent the nozzles, a gas generating assembly disposed within the lining, and means for closing the container to the gas generating assembly within the lining. The air bag inflator is formed by inserting the lining into the container, inserting the gas generating assembly into the lining, and coupling a closure to the container in a manner which closes the container and seals the gas generating assembly within the lining.

29 Claims, 4 Drawing Sheets

AIR BAG INFLATOR AND METHOD OF MAKING THE SAME

Technical Field

The present invention relates to an air bag inflator structure and methods for forming the inflator structure. The inflator structure comprises a container having a wall in which gas discharge nozzles are formed. A lining having a predetermined thickness is disposed immediately adjacent the inside surface of the container wall. A gas generating assembly is disposed within the lining. A closure closes the container and simultaneously seals the gas generating assembly within the lining. The inflator structure is preferably formed by inserting the lining into the container, loading the gas generating assembly into the lining, and coupling the closure to the container in a manner which closes the container and hermetically seals the gas generating assembly within the lining.

BACKGROUND

In a vehicle air bag system, an inflator (or gas generator) is actuated during a collision, and generates gas which inflates an air bag. While various types of inflator structures are currently in use, virtually all inflators have the following basic structures: (i) a container having gas discharge nozzles and a solid gas generating composition, (ii) a filter disposed in the container between the solid gas generating composition and the gas discharge nozzles of the container, and (iii) an ignition device for igniting the gas generating composition.

At the onset of a collision, the ignition device is detonated, and causes ignition of the solid gas generating composition. Burning of the composition generates large quantities of gas. The gas is directed under pressure through the gas discharge nozzles and into the air bag to inflate the air bag. The air bag is inflated within a time frame sufficient to prevent a vehicle occupant from impacting part of the vehicle.

In any air bag system, it is essential that the system deploy the air bag within a specified time of sensing the onset of a collision. The ability of the system to deploy the air bag within the specified time depends to a significant extent on the performance characteristics of the inflator within that time, i.e. the ability of the inflator to generate significant quantities of gas and direct the gas into the air bag within the specified time.

Over the years, different inflator structures with different gas generating compositions having burning surfaces with different geometries have been suggested. The chemicals used in different gas generating compositions and the physical form of the compositions (e.g., loose powder, pressed tablets, or complex, perforated grains) also produce different inflator performance characteristics. For example, certain gas generating compositions, generally referred to as regressive burn gas generating compositions, have an initial burn during which the burning surface is very large, and gas is generated very rapidly. After the initial burn, the rate of gas generation rapidly declines as the burning surface of the composition declines. Other compositions, referred to as progressive and neutral burn gas generating compositions, have smaller burning surfaces for a slower initial burn than regressive burn gas generating compositions, and thus generate gas at a slower rate. With progressive burn gas generating compositions, the rate of gas generation increases to an initial rate. Once the initial rate of burning is achieved, the burning surface, and the rate of gas generation, continue to increase until a peak rate is reached. After reaching the peak rate, the burning surface and gas generation rate decline. With neutral burn gas generating compositions, gas is initially generated at a peak rate. The burning surface is constant after the peak rate is achieved, and gas continues to be generated at the constant rate, until the burning surface and gas generation rate decline.

The performance characteristics of an inflator are also affected by the manner in which a gas generating composition is stored in the inflator, and the manner in which gas flow is directed and filtered before leaving the inflator. For example, in a container for gas generating compositions illustrated in U.S. Pat. No. 4,414,902, a liner of laminated plastic and metal is heat and pressure sealed to a metal blank, which is rolled to form a gas generating container having a hermetic liner, for insertion into an inflator unit. Further, in an inflator illustrated in U.S. Pat. No. 4,296,084, a gas generating composition and a primary filter are disposed within a sealed cartridge contained in an inflator. The cartridge is pre-formed, loaded with the gas generating composition and the primary filter, sealed, and then assembled with the inflator. The cartridge protects the gas generating composition and the filter from the ambient environment. During operation of the inflator, the cartridge ruptures, and gas generated within the cartridge flows through a secondary filtering and cooling structure before flowing out of the inflator.

In an inflator illustrated in U.S. Pat. No. 4,878,690, a gas generating composition and a primary filter device are loaded within a special barrier tube inside the inflator. The barrier tube has openings facing away from the gas discharge nozzles of the inflator. A rupturable membrane is disposed inside the barrier tube to cover the openings in the barrier tube. A pair of end caps close the barrier tube and seal the gas generating composition and the filter in the tube. Another filter surrounds the barrier tube. When the inflator is actuated, the membrane ruptures, and directs gas flow away from the gas discharge nozzles. Thus, the gas flow is along a path through the filter surrounding the barrier tube, before the gas flows out of the inflator.

It is believed that with current gas generating compositions and filter materials, it is important to seal a gas generating composition and filter hermetically within an inflator. Moreover, applicant believes there is a need to enhance the performance characteristics of inflators using progressive and/or neutral burn gas generating compositions. Additionally, applicant believes there is a need to provide such features with an inflator which is relatively simple in design, and efficient to assemble.

SUMMARY OF THE PRESENT INVENTION

The present invention provides a new and useful air bag inflator and a new and useful technique for forming an air bag inflator structure. The inflator is preferably designed for use with a progressive and/or neutral burn gas generating composition, and is believed to provide enhanced performance characteristics when using such types of compositions. Moreover, the inflator is designed to be simply and efficiently assembled with the gas generating composition and filter hermetically sealed in the inflator.

An air bag inflator according to the invention comprises a container and a lining housing a gas generating composition and a filter. An end closure closes the container and simultaneously seals the gas generating composition and filter within the lining. The lining, which is preferably aluminum, is disposed immediately adjacent an inside surface of the container. The gas generating composition and filter (hereinafter the "gas generating assembly") are disposed inside the lining. The end closure is adapted simultaneously to close the container and hermetically seal the gas generating assembly within the lining.

According to the preferred assembly technique, the lining is initially loaded into the container. Next, the gas generating assembly is loaded into the lining. Finally, the end closure is coupled to the container in a manner which simultaneously closes the container and hermetically seals the gas generating composition within the lining.

The lining is disposed immediately adjacent the interior surface of the container. The lining covers the gas discharge nozzles formed in the container. When gas pressure within the lining reaches a predetermined level, the lining will burst to allow gas flow through the gas discharge nozzles.

The thickness of the lining, and the burn rate of the gas generating composition, are designed to produce a predetermined gas pressure rise within the container and a predetermined gas flow from the container. With gas generating compositions of the progressive or neutral type, the lining can be slightly thicker than linings heretofore known to applicant, and yet enhance the overall performance of the inflator. For example, a slightly thicker lining can delay rupture of the lining for a small increment of time, allowing pressure from the gas generating composition to increase for that small increment before the lining ruptures. Allowing pressure to increase for that additional increment of time is believed to enable the inflator to produce and sustain significant gas flow and pressure for a significant time interval. Thus, the lining and the gas generating composition can be designed so that the overall performance characteristics of the inflator are optimized.

The gas generating composition preferably comprises a progressive or neutral burn type of composition such as a mixture of sodium azide, ferric oxide and graphite fiber. Use of a more energetic gas generating compositions (i.e., a regressive burn type of composition) is not as desirable as the less energetic progressive or neutral burn type gas generating compositions. The use of less energetic progressive or neutral burn type gas generating compositions is preferred because the thickness of the lining can be designed more readily to obtain specific gas generating characteristics with the less energetic gas generating compositions.

In the inflator of the invention, a single filter structure is provided. The filter structure is disposed inside the lining and surrounds the gas generating composition. Because the filter structure and the gas generating composition are both hermetically sealed within the lining, both are protected from the environment. Thus, the filter structure can be constructed of material which is less corrosion resistant.

In assembling an inflator according to the invention, the lining is initially loaded into the container. The container comprises a substantially cylindrical wall, with a closed end and an open end. The lining also comprises a substantially cylindrical wall with a closed and an open end. The lining is loaded into the container with the closed end of the lining adjacent the closed end of the container, and the cylindrical wall of the lining adjacent the interior surface of the cylindrical wall of the container.

Next, the gas generating assembly is inserted into the lining. The open end of the lining is flared outward and provides a funnel shaped mouth to enable the filter to be inserted into the lining without possible interference. The filter has a tubular shape with a central cavity. The solid gas generating composition is adapted to be located in the central cavity of the filter. A tube of silicon containing material is adapted to be disposed between the filter and the lining to assist in damping vibration of the gas generating composition when the inflator is in use. The filter, silicon material tube and gas generating composition can be sequentially inserted into the lining, or can be preassembled into a cartridge which is then inserted into the lining.

Once the lining has been loaded into the container, and the gas generating assembly has been loaded into the lining, an end closure is connected to the open end of the container. The end closure closes the container and hermetically seals the gas generating assembly within the lining. Specifically, as the end closure is connected to the container, the flared open end of the lining is captured between the end closure and the open end of the container, to close the container and hermetically seal the gas generating assembly within the lining. A compressible seal ring may be provided at each end of the filter, between the closed end of the lining and the filter on one end, and the end closure and the filter on the other end. The compressible seal rings prevent the generated gas from being discharged from the container other than through the filter. Also, a layer of silicone can be disposed between the seal ring, lining and end closure as the end closure is engaged with the container. The silicone sealant forms an additional barrier between the end closure and the flared open end of the lining.

An electrically actuated igniter is attached to the end closure to complete the inflator. The igniter is preferably attached to the end closure before the end closure is attached to the container.

Further features and advantages of the present invention will become apparent from the following detailed description and the accompanying drawings.

DETAILED DESCRIPTION OF THE PREFERRED EMBODIMENT

Figure 1:
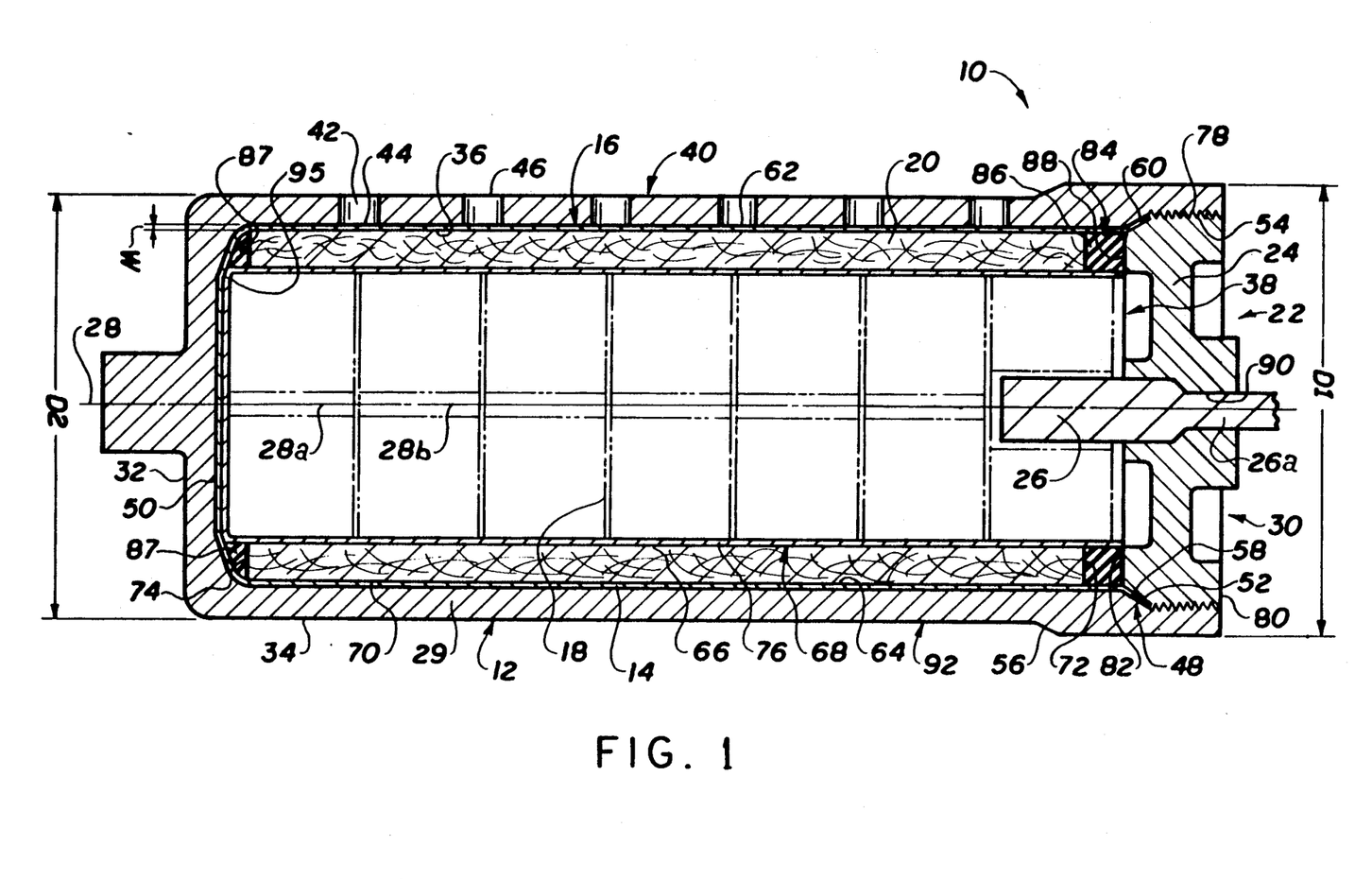
FIG. 1 is a sectional side view of an air bag inflator structure constructed according to the principles of the present invention.
Figure 2:
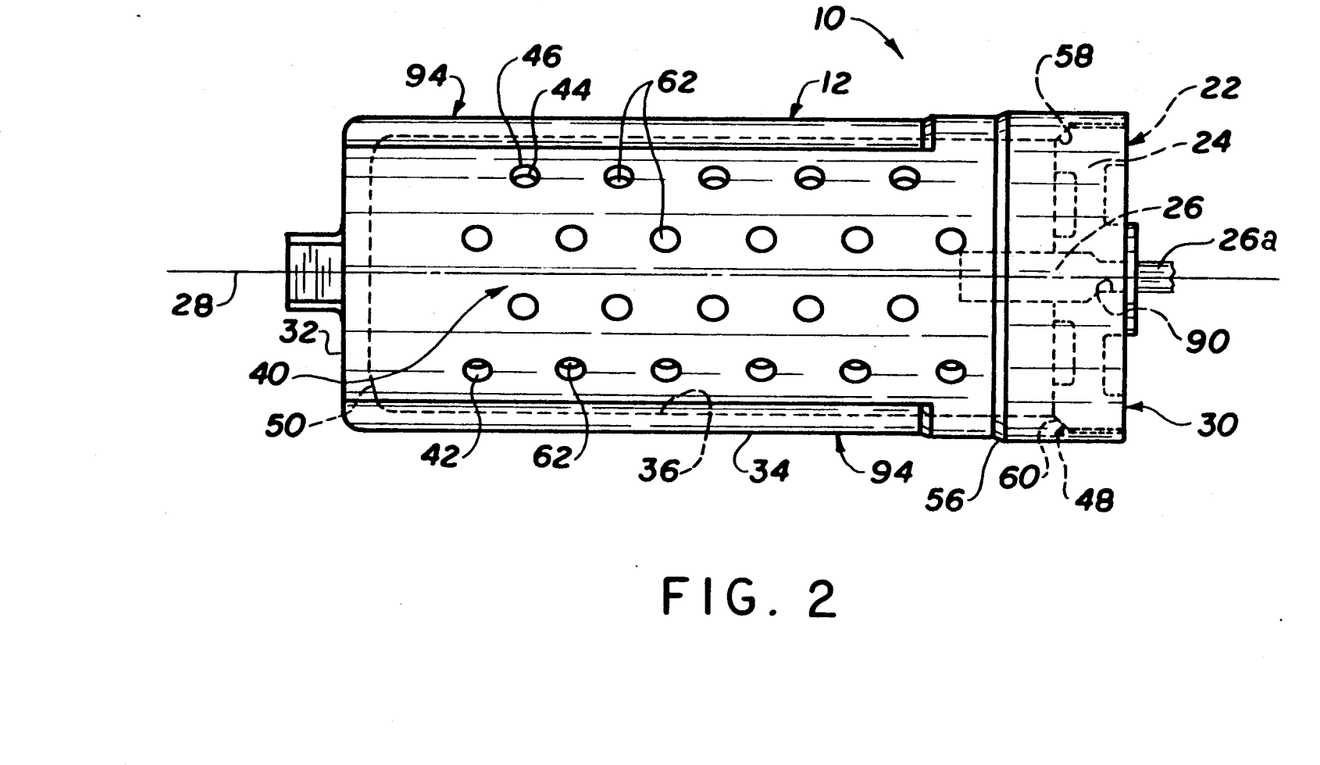
FIG. 2 is a side view of an air bag inflator structure constructed according to the principles of the invention.

FIGS. 1 and 2 illustrate a vehicle air bag inflator structure 10 for a vehicle air bag system. The air bag inflator structure comprises a container 12 and a lining 14 containing a gas generating assembly 16. The gas generating assembly 16 includes a gas generating composition 18 and a filter structure 20. A closure 22, which includes an end closure 24 and an igniter 26, closes and seals the container 12.

The container 12 is a cup-like member with a cylindrical wall 29 and an end wall 32 at one end of the cylindrical wall 29. The end wall 32 defines a closed end of the container 12. The opposite end of the cylindrical wall 29 defines an open end 30 of the container 12. The cylindrical wall 29 circumscribes a longitudinal central axis 28 of the container 12. The end wall 32 is formed in one piece with the cylindrical wall 29.

The cylindrical wall 29 has an exterior surface 34 and an interior surface 36. The interior surface 36 defines a cavity 38 for receiving the gas generating assembly 16. The open end 30 of the container 12 has a larger diameter D1 than the external diameter D2 of the end wall 32. The open end 30 includes an internally threaded portion 54 which engages an externally threaded portion 78 of the end closure 24. Between the larger and smaller diameter D1, D2 portions of the container 12, the exterior surface 34 of the wall 29 includes an external tapered portion 56. An internal tapered portion 58 is also provided in the interior surface 36 adjacent the internally threaded portion 54 of the container 12.

A nozzle area 40 extends along a selected longitudinal portion of the exterior surface 34 of the wall 29 and partially circumscribes the longitudinal axis 28. Gas discharge nozzles 42 are located in the nozzle area 40 and extend radially through the wall 29 of the container 12. The gas discharge nozzles 42 provide means for directing gas from the inflator structure 10. Each of the gas discharge nozzles 42 has an inlet 44 formed in the interior surface 36 and an outlet 46 formed in the exterior surface 34.

The lining 14 is disposed within the container 12, immediately adjacent the interior surface 36 of the container wall 29. The lining 14 has a central longitudinal axis 28a which coincides with the central axis 28 of the container 12. The lining 14 has an open end 48 and a closed end 50 having an interior bottom surface 95. The lining 14 is substantially cylindrical in shape and circumscribes the longitudinal axis 28a. The distance between the open end 48 and closed end 50 of the lining 14 corresponds substantially to the distance between the open end 30 and closed end 32 of the container 12. The open end 48 of the lining 14 is flared outward to form a funnel shaped wall 52. The funnel shaped wall 52 of the lining 14 is adapted to be captured between an outwardly tapered exterior portion 60 of the end closure 24 and the internal tapered portion 58 of the container 50 open end 30, as shown in Figure once assembly of the inflator structure 10 is completed.

The lining 14 is disposed within the container 12 immediately adjacent the interior surface 36 of the wall 29 and covers the inlets 44 of the gas dispensing nozzles 42. The thickness W of the lining 14 is uniform throughout the lining proximate the gas dispensing nozzles 42, and covering the nozzle inlets 44. The uniform thickness W of the metal foil lining 14 provides bursting locations 62 in the lining at each nozzle inlet 44 once the inflator is actuated.

The thickness W of the lining 14 is predetermined based on the desired rate of gas discharge from the inflator structure 10. By selecting a lining thickness W, gas generating composition 18 (including, for example, the chemical make-up of the composition and its physical form), the maximum internal pressure within the lining 14 and the time at which the locations 62 of the thin foil lining 14 will rupture can be predicted. Thus, inflator performance characteristics, such as the rate of gas discharge and the rate of air bag inflation, can be predetermined using the lining thickness W and gas generating composition 18.

As further illustrated in FIG. 1, the filter structure 20 is positioned immediately adjacent an internal surface 64 of the lining 14. The filter structure 20 in the illustrated embodiment consists of at least one filter layer which is substantially cylindrical in shape with a central longitudinal axis 28b. The filter 20 includes an internal surface 66 defining a central cavity 68 and circumscribing the longitudinal axis 28b. The filter structure 20 also includes an external surface 70 and two open ends 72, 74. The filter structure 20 is supported within the lining 14 in a position such that the longitudinal axes 28, 28a and 28b of the container 12, lining 14 and filter structure 20 coincide.

The filter structure 20 is manufactured of materials such as carbon steel wire mesh, carbon steel-steel wool, fiberglass and ceramic felt-like materials. Materials which are less corrosion resistant, such as carbon steel wire mesh, are acceptable because the filter structure 20 is hermetically sealed within the lining 14 once assembly of the inflator structure 10 is completed. Upon bursting of the foil lining 14, at the bursting locations 62, pressurized gas passes through the filter structure 20 prior to escaping through the nozzle inlets 44 and nozzle outlets 46 of the gas dispensing nozzles 42.

The gas generating composition 18 is located within the central cavity 68 defined by the filter structure 20. The gas generating composition 18 of the preferred embodiment includes sodium azide, ferric oxide, and graphite fiber. Alternatively, the gas generating composition may include other gas generating materials.

To assist with handling of the gas generating composition 18 during assembly of the inflator 10, the gas generating composition 18 is dispensed in cartridge form as illustrated in FIG. 1. In cartridge form, a thin silicon material tube 76 surrounds and contains the gas generating composition 18. The tube 76 forms an isolation device which damps certain vibrations to which the composition 18 may be subjected during assembly of the inflator structure 10 or during operation of the vehicle.

The end closure 24 closes the container 12 and simultaneously hermetically seals the gas generating composition 18 within the lining 14. The end closure 24 also supports the igniter 26. The end closure 24 has a top surface 80 and a bottom surface 82. An externally threaded circumferential portion 78 of the closure 24 engages the internally threaded portion 54 in the open end 30 of the container 12. The end closure 24 additionally includes a tapered circumferential portion 60 between the externally threaded portion 78 and the bottom surface 82 of the end closure. The tapered portion 60 of the end closure corresponds to the tapered portion 58 in the open end 30 of the container 12 and the funnel shaped wall 52 of the lining 14. Thus, engagement of the end closure 24 with the container 12 captures the funnel shaped wall 52 between the tapered portions 58, 60. Capturing the funnel shaped wall 52 of the lining between the tapered portions 58, 60, assists with hermetic sealing of the filter structure 20 and gas generating composition 18 within the lining 14.

To prevent the generated gas from being discharged from the container other than through the filter structure 20, additional seals 84 may be provided. In the preferred embodiment of FIG. 1, the additional seals 84 include a first compressible seal ring 86 disposed intermediate one open end 72 of the filter structure 20 and the bottom surface 82 of the end closure 24, and a second compressible seal ring 87 disposed intermediate the other open end 74 of the filter structure and the interior bottom surface 95 of the closed end 50 of the lining. The first and second seal rings 86, 87 have a rectangular, cross-sectional configuration, and fill the space intermediate the open end 72 of the filter structure 20 and bottom surface 82 of the end closure 24, and the open end 74 of the filter structure and the interior bottom surface 95 of the lining. In this position, the seal rings 86, 87 engage the bottom surface 82 of the end closure, the interior bottom surface 95 of the lining 14, the interior surface 64 of the lining, and the gas generating assembly 16.

In the preferred embodiment, to ensure the hermetic seal of the gas generating assembly 16, an additional seal 88 is also provided to assist engagement of the end closure 24 with the container 12. As illustrated in FIG. 1, a thin layer of silicone sealant is provided on the first seal ring 86. The sealant is initially in liquid form, to provide lubrication between the first seal ring 86 and bottom surface 82 of the end closure 24 and between the funnel shaped wall 52 of the lining 14 and tapered portion 60 of the end closure 24. During engagement of the end closure 24 with the container 12, the liquid sealant flows between the tapered portion 60 of the end closure 24 and the open end 52 of the lining 14. Once the end closure 24 is secured in sealing engagement with the open end 30 of the container 12, the liquid sealant dries as a layer of silicone sealant 88. The dried sealant 88 provides a further barrier preventing the discharge of gas from the container other than via the burst locations 62 and gas dispensing nozzles 42.

The gas generating composition 18 is ignited by the igniter 26, which is preferably an electrical device forming part of the closure 22, as illustrated in FIG. 1. The electric igniter 26 includes a wiring harness 26a, which is partially disposed within a central opening 90 in the end closure 24. The central opening 90 has a central axis which is aligned with the central longitudinal axis 28 of the container 12 when the end closure 24 is engaged with the open end 30 of the container. Upon receiving a collision signal via the wiring harness 26a from a vehicle sensor located externally of the inflator, the igniter 26 ignites the gas generating composition 18, to initiate gas generation.

ASSEMBLY

In forming the air bag inflator structure 10, the container 12 is initially cold formed by impact extrusion. The preferred material is 2014 aluminum, which is light weight, high strength aluminum, and well known as a material that can be readily formed by conventional impact extrusion techniques. Generally, the techniques for impact extruding a cup-like part such as the container 12 of the invention are known to those of ordinary skill in the aluminum fabricating arts. The presses, the tooling, and the lubricant for impact extruding 2014 aluminum are all well known. The container 12 may be extruded such that the wall 29 includes a relatively complex, external geometry, such as is described in U.S. Pat. No. 4,938,501. Like the inflator structure of U.S. Pat. No. 4,938,501, the wall 29 of the present invention includes the nozzle area 40, a reaction area 92 diametrically opposite the nozzle area, and connecting areas 94 extending between the nozzle area and reaction area.

In the illustrated embodiment of FIGS. 1 and 2, the thickness of the wall 29 in the nozzle area 40 and the thickness of the wall 29 in the reaction area 92 are substantially the same. The connecting areas 94, intermediate the nozzle and reaction areas, have a thickness which is less than the thicknesses of the nozzle and reaction areas 40, 92. The container interior surface 36 has a constant diameter of approximately 52.3 millimeters. For purposes of comparison, the thickness of the wall 29 in the nozzle and reaction areas is approximately 3.7 millimeters, while the thickness of the wall in the connecting areas is approximately 3.1 millimeters. The thickness of the wall 29 at the open and closed ends 30, 32 of the container 12, is greater, approximately 4.4 millimeters, than the thickness at either the nozzle, reaction or connecting areas. The additional wall thickness in the open and closed ends 30, 32 resists the relatively high pressures exerted on the container 12 during gas generation.

The gas dispensing nozzles 42 are drilled in the container 12, and the internal threads of the threaded portion 54 are formed to match the external threads of the threaded portion 78 of the end closure 24.

Once the container 12 is completed, the lining 14 is then inserted into the open end 30 of the container 12 so that the closed end 50 of the lining is adjacent the closed end 32 of the container and the lining 14 is adjacent to the interior surface 36 of the wall 29.

The lining 14 is a cup-like member which is also cold formed by impact extrusion or deep draw. The lining 14 is preferably formed of a thin aluminum foil, which is light in weight, and well known for its pliability during formation. As the techniques for forming the lining are well known to those of ordinary skill in the aluminum fabrication arts, details of the techniques are not further discussed.

In the preferred embodiment of the lining 14, its thickness W ranges from approximately 0.005 inches to 0.01 inches. The thickness W is selected based on the rate of air bag inflation desired from the inflator structure 10 when using a desired amount of progressive or neutral burn type gas generating composition. Thicker linings 14 result in higher air bag internal pressures and higher rates of air bag inflation. This result is obtained because pressure is permitted to build up within the lining over a longer time and to a higher level than in inflators having thinner linings. Thus, upon bursting, the rate of gas discharge from inflators having a thicker lining is also higher.

Figure 4:
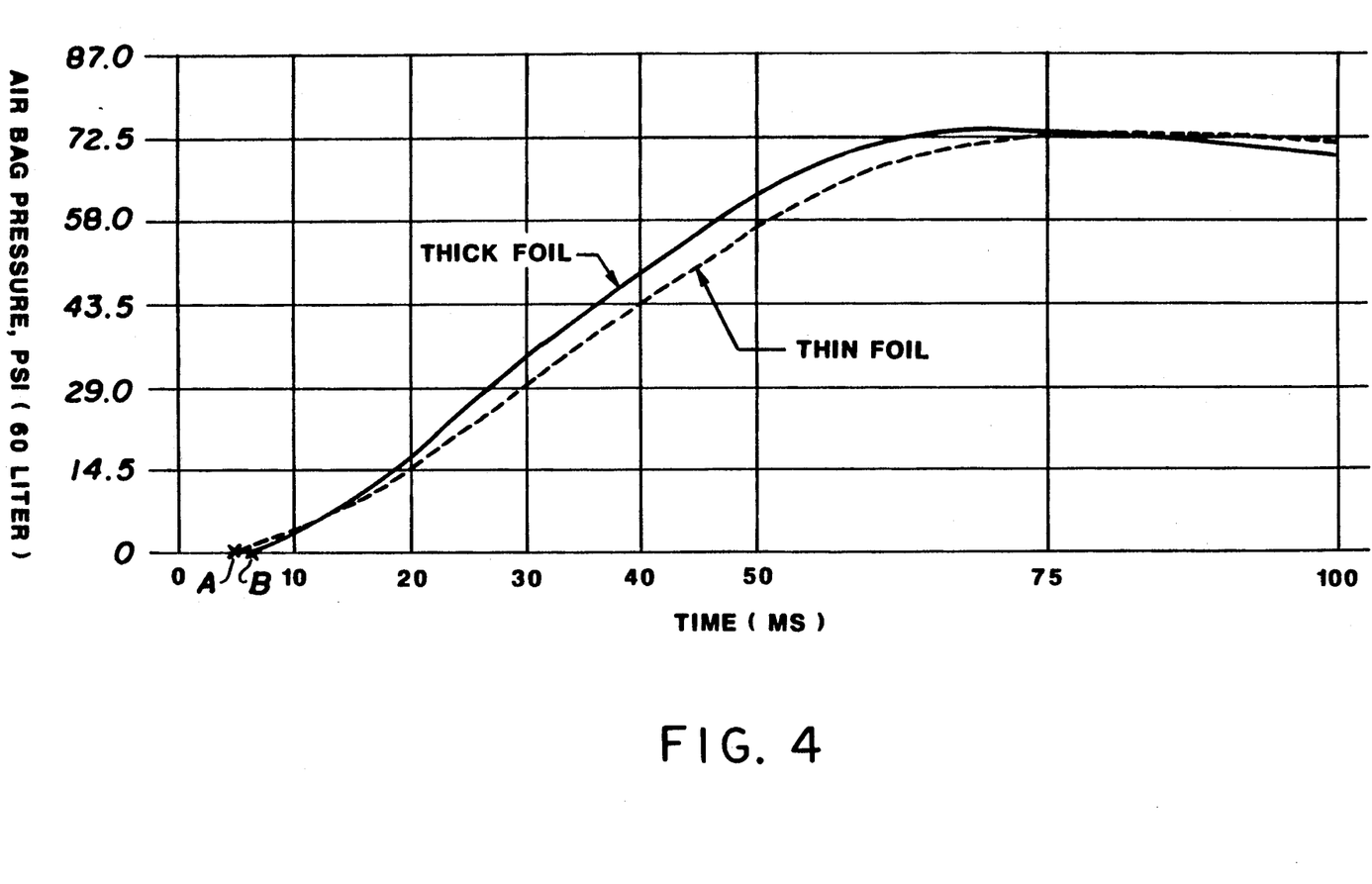
FIG. 4 is a graphical representation of inflator performance or the rate of air bag inflation, using both a thick and thin lining in the inflator structure of the present invention, as represented by the pressure within a 60 liter air bag test tank versus time.

A comparison of the rate of gas discharge from both thicker and thinner type linings is shown by the example in FIG. 4. In FIG. 4, an inflator structure using a "Thick Foil" lining 14 of 0.008 inches is shown to discharge gas into an air bag after 6 milliseconds and achieves an internal air bag pressure of approximately 62 psi after 50 milliseconds. A "Thin Foil" lining 14 of 0.0065 inches is shown to discharge gas into an air bag after only 5 milliseconds and results in an internal air bag pressure of only approximately 57 psi after 50 milliseconds. With a gas generating composition of complex, perforated grains comprising sodium azide, iron oxide and graphite fibers, a lining thickness W of at least 0.006 inches is preferred in order to optimize the rate of air bag inflation, without compromising other inflator performance characteristics, for example by delaying the time at which the lining 14 ruptures for too long a period of time.

The seals 84 and cylindrical filter structure 20 are next inserted into the container 12. The second compressible seal ring 87 is then inserted into the container and engagement with the interior bottom surface 95 of the lining 14. The filter structure is next inserted adjacent the second compressible seal ring 87 and the internal surface 64 of the lining 14. The silicon material isolation tube 76 containing the gas generating composition 18 is then inserted into the container 12, adjacent the filter structure 20. Alternatively, the gas generating assembly 16, or the silicone material isolation tube 76 containing the gas generating composition 18 within the cylindrical filter structure 20, is inserted into the container 12. The first compressible seal ring 86 is then inserted into the open end 30 of the container 12 adjacent the open end 72 of the filter structure 20. When the closure 22 is ready for engagement with the container 12, the liquid silicone sealant is applied to the first seal ring 86.

The closure 22, with electric igniter 26 disposed at least partially within the end closure 24, is then engaged with the container 12 to complete assembly of the air bag inflator structure 10. The threaded portion 78 of the end closure 24 is screwed into the threaded portion 54 of the open end 30 of the container 12. The funnel shaped wall 52 of the lining 14 is thereby trapped intermediate the tapered portion 60 of the end closure 24 and the internal tapered portion 58 of the container 12. In the event the container and end closure are not engaged by a threaded attachment, as in the illustrated embodiment, the attachment may comprise snapping the end closure 24 into the open end 30 of the container 12, or other known means of attachment. Using either attachment, this step serves to close the container 12 and hermetically seal the gas generating composition 18 within the lining 14, without damaging the lining. No separate means of sealing the lining 14, such as crimping, is required.

Figure 3:
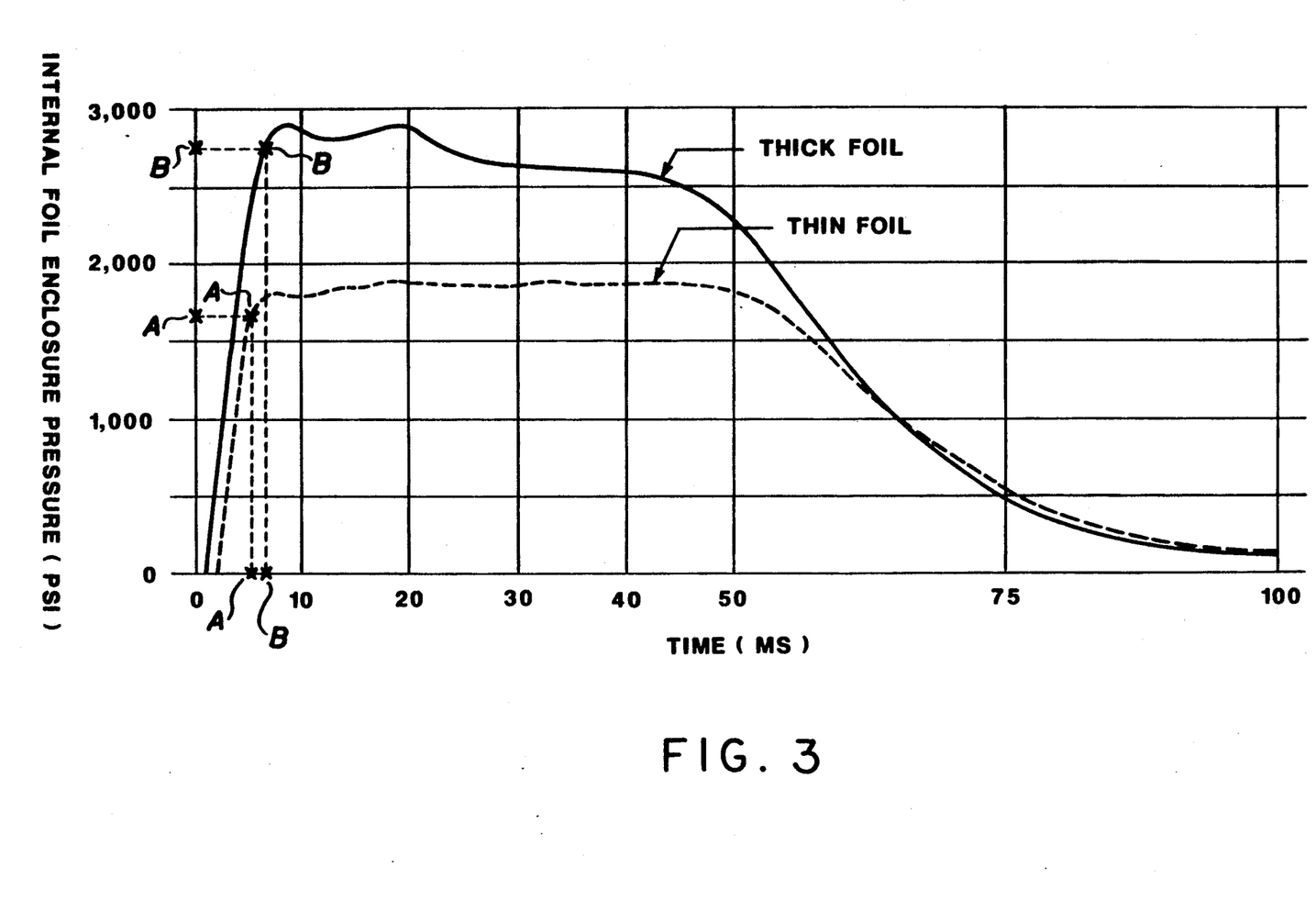
FIG. 3 is a graphical representation of the pressure within a thick and thin lining in the inflator structure of the present invention versus time.

The graphical representations in FIGS. 3 and 4 show inflator performance characteristics measured during the ignition of inflator structures 10, according to the present invention. FIGS. 3 and 4 compare the performance of inflators which are identical except for the thicknesses W of their linings 14. Specifically, the performance of the thicker lining is illustrated as a solid curve referred to as "Thick Foil", and the performance of the thinner lining 14 is illustrated as the dashed curve referred to as "Thin Foil".

In FIG. 3, the internal pressure within the sealed lining 14 is shown along the vertical y-axis, and time is shown along the horizontal x-axis. The time and internal lining pressure at which the lining bursts are referenced generally at A for the "Thin Foil" and at B for the "Thick Foil", along the horizontal axis, vertical axis and the curves, respectively. As illustrated, the internal pressure within the "Thick Foil" lining was higher than that of the "Thin Foil" lining, but ruptured later in time than the "Thin Foil" lining. Thus, although the "Thin Foil" lining ruptured earlier, it discharged gas from the inflator more slowly than the "Thick Foil" lining.

FIG. 4 illustrates the effect of the thickness W of the lining 14 on the rate of air bag inflation. As set forth above, the internal pressure (shown along the vertical y-axis) of an air bag is illustrated over time (shown along the horizontal x-axis), after the lining 14 is ruptured. The time, internal pressure and location at which the lining bursts are referenced generally at A for the "Thin Foil" and B for the "Thick Foil", along the horizontal axis, vertical axis and the curves, respectively. The inflator having the "Thick Foil" lining achieved a higher internal air bag pressure more quickly than the inflator having the "Thin Foil" lining, even though the "Thin Foil" lining burst earlier and began dispensing gas into the air bag earlier. Overall performance of the inflator structure 10 can thus be selected using different lining thicknesses W.

Accordingly, a vehicle air bag inflator structure has been described above which has a lining 14 containing a gas generating assembly 16. The thickness of the lining W and the type of generating composition are selected to determine the time frame in which the lining will burst and the rate at which gas is dispensed from the inflator structure into the air bag. Further, the inflator structure has a single closure which closes the container 12 and hermetically seals the gas generating assembly 16 within the lining 14 in a single attachment step. The preferred method of forming the inflator structure has been described above. However, with the present disclosure in mind, it is believed that obvious alternatives to the preferred embodiment, to achieve comparable features and advantages in other air bag inflators, will become apparent to those of ordinary skill in the art.

What is claimed is:

1. An apparatus comprising an air bag inflator structure adapted to direct gas generated under pressure into an air bag, said inflator structure comprising:

a container having a tubular housing wall with an exterior surface forming part of the exterior of said container and an interior surface defining an internal cavity, said tubular housing wall having gas dispensing nozzles extending therethrough, each of said dispensing nozzles having an inlet formed in said interior surface of said tubular housing wall and an outlet formed in said exterior surface of said tubular housing wall, a tubular lining disposed inside said internal cavity defined by said tubular housing wall, said tubular lining being located immediately adjacent said interior surface of said tubular housing wall so as to cover the inlets of said gas dispensing nozzles, a gas generating composition disposed within said tubular lining, said gas generating composition being ignitable to generate gas within said tubular lining, and an end closure coupled with an end of said tubular housing wall, said end closure capturing an end portion of said tubular lining between said end closure and said end of said tubular housing wall to simultaneously close the end of said tubular housing wall and said end portion of said tubular lining, said tubular lining being adapted to burst at locations adjacent the inlets of said gas dispensing nozzles when gas pressure within said tubular lining exceeds a predetermined amount, to permit gas generated within said tubular lining to be directed through said gas dispensing nozzles and from said container.

2. An apparatus comprising an air bag inflator structure as defined in claim 1, wherein the portion of said lining covering the inlets of said gas dispensing nozzles has a uniform, predetermined thickness, said uniform thickness being predetermined as a function of the burn rate of said gas generating composition, whereby the thickness of said lining and the burn rate of said gas generating composition determine both the time frame in which the lining will burst and the rate at which gas will be directed through said gas dispensing nozzles.

3. An apparatus comprising an air bag inflator structure as defined in claim 2 wherein said lining is formed of aluminum.

4. An apparatus comprising an air bag inflator structure as defined in claim 3, wherein said lining has a uniform predetermined thickness of at least about 0.006 inch.

5. An apparatus comprising an air bag inflator structure as defined in claim 3, wherein said lining has a uniform predetermined thickness of from about 0.005 inch to about 0.01 inch.

6. An apparatus comprising an air bag inflator structure as defined in claim 5, wherein said lining has a maximum thickness of about 0.01 inch.

7. An apparatus comprising an air bag inflator structure as defined in any of claims 2-6, wherein said gas generating composition is a progressive burn type of gas generating composition.

8. An apparatus comprising an air bag inflator structure as defined in claim 7, wherein said gas generating composition comprises a mixture of sodium azide, ferric oxide, and graphite fiber.

9. An apparatus comprising an air bag inflator structure as defined in claim 1, wherein said gas generating means further comprises gas filtering means disposed between said gas generator composition and said lining.

10. An apparatus comprising an air bag inflator structure as defined in claim 9, further comprising a thin isolation tube of silicon based material disposed between said gas generating composition and said gas filtering means.

11. An apparatus comprising an air bag inflator structure as defined in claim 1, wherein said container has a cylindrical housing wall which is closed at one end and open at the other end, said tubular lining comprising a cylindrical tube which is closed at one end and open at the other end, the open end of said cylindrical tube being surrounded by the open end of the cylindrical housing wall, and said end closure closes the open ends of said cylindrical housing wall and said cylindrical tube.

12. An apparatus comprising an air bag inflator structure as defined in claim 11, wherein said end closure comprises an end cap having an exterior configuration matching the internal configuration of said open end of said cylindrical housing wall of said container, the open end of said cylindrical tube has an outwardly flared funnel shaped configuration, said open end of said cylindrical tube being captured between the open end of said cylindrical housing wall of said container and said end cap to close said lining.

13. An apparatus comprising an air bag inflator structure as defined in claim 9, wherein said end closure is adapted to receive at least part of an igniter capable of igniting said gas generating composition.

14. An apparatus comprising an air bag inflator structure as defined in claim 13, wherein said lining is formed of aluminum.

15. An apparatus comprising an air bag inflator structure as defined in claim 14, wherein said lining has a uniform predetermined thickness of at least about 0.006 inch.

16. An apparatus comprising an air bag inflator structure as defined in claim 14, wherein said lining has a uniform predetermined thickness of from about 0.005 inch to about 0.01 inch.

17. An apparatus comprising an air bag inflator structure as defined in any of claims 9-16, wherein said gas generating composition is a progressive burn type of gas generating composition.

18. An apparatus comprising an air bag inflator structure as defined in claim 17, wherein said gas generating composition comprises a mixture of sodium azide, ferric oxide, and graphite fibers.

19. An apparatus comprising an air bag inflator structure as defined in claim 17, wherein said container and said filtering means are substantially cylindrical in shape.

20. An apparatus comprising an air bag inflator structure as defined in claim 19, further comprising sealing means disposed intermediate said end closure and said filtering means.

21. An apparatus comprising an air bag inflator structure as defined in claim 20, wherein said sealing means comprises a partially compressible seal ring.

22. An apparatus comprising an air bag inflator structure as defined in claim 21, wherein said flared end of said lining extends beyond said sealing means toward said end closure.

23. An apparatus comprising an air bag inflator structure as defined in claim 2, wherein said gas generating composition is a neutral burn type of gas generating composition.

24. An apparatus comprising an air bag inflator structure as defined in claim 2, wherein said gas generating composition is a neutral burn type of gas generating composition.

25. An air bag inflator structure comprising:

a container containing a gas generating means and adapted to direct gas generated by said gas generating means from the container, said container having a cylindrical wall with an exterior surface forming part of the exterior of said container and an interior surface defining an internal cavity within which said gas generating means is disposed, said wall having gas dispensing nozzles extending therethrough, each of said dispensing nozzles having an inlet formed in said interior surface of said wall and an outlet formed in said exterior surface of said wall, a lining disposed in said container, said lining being located immediately adjacent said interior surface of said wall so as to cover the inlets of said gas dispensing nozzles, and having an open end with an outwardly flared funnel shaped configuration, a solid gas generating composition disposed within said lining, said solid gas generating composition being ignitable to generate gas within said container, closure means for closing said container, said closure means comprising an end cap having an exterior configuration matching the internal configuration of said cylindrical wall of said container, and said open end of said lining being captured between the open end of said cylindrical wall of said container and said end cap to close and seal said lining, and said lining being adapted to burst at locations adjacent the inlets of said gas dispensing nozzles when gas pressure within said container exceeds a predetermined amount, to permit gas generated within said container to be directed through said gas dispensing nozzles and from said container.

26. A method of forming an air bag inflator structure comprising the steps of:
(a) providing a container having a cylindrical wall with gas dispensing nozzles extending through said cylindrical wall, the cylindrical wall having an interior surface defining a cavity, the cylindrical wall having a closed end and an open end,
(b) providing a tubular lining adapted when inserted into said cavity to lie adjacent to said interior surface of said cylindrical wall and to cover the gas dispensing nozzles extending through said cylindrical wall,
(c) inserting said tubular lining into said cavity, said tubular lining having an open end adjacent to the open end of the cylindrical wall,
(d) thereafter inserting gas generating means into said tubular lining, and
(e) coupling an end closure with said cylindrical wall in a manner which simultaneously (i) captures a portion of said tubular lining between said end closure and said cylindrical wall, (ii) closes the open end of the cylindrical wall, and (iii) closes the open end of the lining.

27. A method as defined in claim 26, wherein the step of inserting gas generating means into said tubular lining comprises inserting a gas filtering means and a gas generating composition into said filtering means.

28. A method as defined in claim 27, wherein the step of coupling said end closure to said container further comprises the step of inserting an igniter into said end closure prior to coupling said end closure to said container.

29. An air bag inflator structure comprising:

a container having a tubular housing wall with an exterior surface forming part of the exterior of said container and an interior surface defining an internal cavity, said tubular housing wall having gas dispensing nozzles extending therethrough, each of said dispensing nozzles having an inlet formed in said interior surface of said tubular housing wall and an outlet formed in said exterior surface of said tubular housing wall, a tubular lining disposed inside said internal cavity defined by said tubular housing wall, said tubular lining being located immediately adjacent said interior surface of said tubular housing wall so as to cover the inlets of said gas dispensing nozzles, a gas generating composition disposed within said tubular lining, said gas generating composition being ignitable to generate gas within said tubular lining, gas filtering means disposed between said gas generating composition and said tubular lining, an end closure coupled with an end of said tubular housing wall, said end closure capturing an end portion of said tubular lining between said end closure and said end of said tubular housing wall to simultaneously close the end of said tubular housing wall and said end portion of said tubular lining, said tubular lining being adapted to burst at locations adjacent the inlets of said gas dispensing nozzles when gas pressure within said tubular lining exceeds a predetermined amount, to permit gas generated within said tubular lining to be directed through said gas dispensing nozzles and from said container.

* * * * *

UNITED STATES PATENT AND TRADEMARK OFFICE
CERTIFICATE OF CORRECTION

PATENT NO. : 5,116,080
DATED : May 26, 1992
INVENTOR(S) : Pongdet Wipasuramonton It is certified that error appears in the above-identified patent and that said Letters Patent is hereby corrected as shown below:

Column 11, line 29, please delete "generator" and insert -- generating --.

Signed and Sealed this

Twenty-fourth Day of August, 1993

Attest:

BRUCE LEHMAN

Attesting Officer

Commissioner of Patents and Trademarks